United States Patent
Jacobus et al.

(10) Patent No.: US 10,895,460 B2
(45) Date of Patent: Jan. 19, 2021

(54) SYSTEM AND METHOD FOR GENERATING PRECISE ROAD LANE MAP DATA

(71) Applicant: Cybernet Systems Corporation, Ann Arbor, MI (US)

(72) Inventors: Charles J. Jacobus, Brighton, MI (US); Glenn J. Beach, Grass Lake, MI (US); Douglas Haanpaa, Dexter, MI (US)

(*) Notice: Subject to any disclaimer, the term of this patent is extended or adjusted under 35 U.S.C. 154(b) by 338 days.

(21) Appl. No.: 15/804,488

(22) Filed: Nov. 6, 2017

(65) Prior Publication Data

US 2019/0137284 A1 May 9, 2019

(51) Int. Cl.
| | |
|---|---|
| *G01C 21/32* | (2006.01) |
| *G01C 21/16* | (2006.01) |
| *G05D 1/02* | (2020.01) |
| *G01S 19/48* | (2010.01) |
| *G01S 19/13* | (2010.01) |
| *G01S 19/41* | (2010.01) |

(52) U.S. Cl.
CPC ........... *G01C 21/32* (2013.01); *G01C 21/165* (2013.01); *G01S 19/48* (2013.01); *G05D 1/0274* (2013.01); *G01S 19/13* (2013.01); *G01S 19/41* (2013.01); *G05D 1/027* (2013.01); *G05D 1/0246* (2013.01); *G05D 1/0278* (2013.01)

(58) Field of Classification Search
CPC ....... G01C 21/32; G01C 21/165; G01S 19/48; G01S 19/41; G01S 19/13; G05D 1/0274; G05D 1/0278; G05D 1/0246; G05D 1/027
USPC .............. 701/23, 455, 472; 382/103; 702/95
See application file for complete search history.

(56) References Cited

U.S. PATENT DOCUMENTS

| | | | | |
|---|---|---|---|---|
| 2003/0072471 | A1* | 4/2003 | Otsuka ................ | G05D 1/0246 382/103 |
| 2008/0046274 | A1* | 2/2008 | Geelen .................. | G01C 21/32 717/176 |
| 2010/0076681 | A1* | 3/2010 | Colley .................. | G01C 17/30 701/472 |
| 2010/0292886 | A1* | 11/2010 | Szczerba .............. | G01S 13/723 701/31.4 |
| 2011/0320156 | A1* | 12/2011 | Oohashi ................ | G01C 21/30 702/95 |
| 2014/0277897 | A1* | 9/2014 | Saiz ...................... | G05D 1/021 701/23 |

(Continued)

*Primary Examiner* — Shardul D Patel
(74) *Attorney, Agent, or Firm* — Law Offices of John G. Posa

(57) ABSTRACT

An in-vehicle system for generating precise, lane-level road map data includes a GPS receiver operative to acquire positional information associated with a track along a road path. An inertial sensor provides time local measurement of acceleration and turn rate along the track, and a camera acquires image data of the road path along the track. A processor is operative to receive the local measurement from the inertial sensor and image data from the camera over time in conjunction with multiple tracks along the road path, and improve the accuracy of the GPS receiver through curve fitting. One or all of the GPS receiver, inertial sensor and camera are disposed in a smartphone. The road map data may be uploaded to a central data repository for post processing when the vehicle passes through a WiFi cloud to generate the precise road map data, which may include data collected from multiple drivers.

17 Claims, 7 Drawing Sheets

(56) References Cited

U.S. PATENT DOCUMENTS

| | | | |
|---|---|---|---|
| 2016/0264003 A1* | 9/2016 | Yokoyama | B60W 10/08 |
| 2016/0311431 A1* | 10/2016 | Kato | B62D 1/28 |
| 2017/0021829 A1* | 1/2017 | Nishimura | B60W 10/18 |
| 2017/0341653 A1* | 11/2017 | Kubota | B60W 30/18163 |
| 2017/0343374 A1* | 11/2017 | Yi | G01C 21/3632 |
| 2018/0067496 A1* | 3/2018 | Prasad | G08G 1/167 |
| 2018/0259972 A1* | 9/2018 | Heo | B60W 30/00 |

* cited by examiner

SYSTEM AND METHOD FOR GENERATING PRECISE ROAD LANE MAP DATA

FIELD OF THE INVENTION

This invention relates generally to autonomous or driverless vehicles and, in particular, to a system and method for generating precise lane map data.

BACKGROUND OF THE INVENTION

There are three approaches being pursued to implement Level 4[1] or 5 vehicle autonomy (driverless operation of the vehicle). The first is adaptive lane detection and keeping, the second is using precision GPS (DGPS or equivalent) augmented by inertial sensing, to keep the vehicle in the lane by referencing to precision GPS coordinate maps of each lane in a road segment, and the third is using 3D simultaneous localization and mapping, typically using 3D range sensing, to correlate vehicle position relative to surrounding pre-mapped terrain features (road berms, buildings, barriers, etc.).

[1] SAE Automated Driving in Standard J3016.

In the first case, the problem is that computer vision to detect road or lane boundaries is not possible for all drivable lanes. Sometimes white or yellow lines marking lanes are indistinct, sometimes they are obscured by weather (ex: snow rain, dirt) or by other obstructions (road work, other vehicles parked by the side of the road, etc.), and sometimes lighting conditions are not favorable (sun in the image washes out all other content, it is too dark out, etc.).

The second case requires precision maps of roadways down to the lane, perhaps accurate to 2 cm to 10 cm (a tire width). This is too accurate for aerial and satellite based road mapping and requires that each and every road be so mapped).

In the third case, we have the same problem as in the second case. One-hundred percent of the road surround has to be mapped to 2 cm to 10 cm accuracy, and that data is subject to changes in the surrounding areas (roadwork, new building construction, seasonal changes in foliage density, and other effects that are not likely to be well controlled).

In our analysis, the primary Level 4/5 control or and third approaches it will be necessary to know lane positions in Earth (GPS) coordinates to the precision required by the second approach for every path that is potentially autonomously driven.

SUMMARY OF THE INVENTION

An in-vehicle system for generating precise, lane-level road map data includes a GPS receiver operative to acquire positional information associated with a track along a road path, and wherein the positional information has an accuracy. An inertial sensor provides time local measurement of acceleration and turn rate along the track, and a camera acquires image data of the road path along the track. A processor is operative to receive the local measurement from the inertial sensor and image data from the camera over time in conjunction with multiple tracks along the road path, and improve the accuracy of the GPS receiver through curve fitting.

In accordance with a preferred embodiment, one or all of the GPS receiver, inertial sensor and camera are disposed in a smartphone. The camera may be a look-ahead or look-behind camera, and the inertial sensor provides time local measurement of acceleration and turn rate in three dimensions. The processor is operative to solve for vehicle position as follows:

Position$(P_X P_Y P_Z) = \Sigma_t(\Sigma_t\{A_x A_y A_z\} + V_0) + P_0$ and
Driving direction$(\alpha\beta\gamma) = \Sigma_t\{d_\alpha\ d_\beta\ d_\gamma\} + [\alpha_0\ \beta_0\ \gamma_0]$ where $P_0$ and $V_0$ were respectively the last known good position update and the last known velocity update for the vehicle, and Ax, Ay and Az are measured acceleration over time; $[\alpha_0\ \beta_0\ \gamma_0]$ are the last known good heading, and $d_\alpha\ d_\beta\ d_\gamma$ the three measure heading change gyro measurements.

The system is operative to generate precise road map data based upon the improved accuracy of the GPS receiver. The system may further include a transmitter for transmitting the road map data to a central data repository for post processing to generate the precise road map data, which may include lane locations within roads based upon data collected from multiple drivers. The road map data may be uploaded to a central data repository for post processing when the vehicle passes through a WiFi cloud.

The road map data may include paths around transient road features, enabling the road map data to be updated for multiple vehicles in accordance with the transient road features. Such transient road features may include construction sites, traffic diversions, or newly opened road or lane paths. The vehicle may be an autonomous or "driverless" vehicle.

Corresponding methods for generating precise, lane-level road map data are also disclosed herein.

DETAILED DESCRIPTION OF THE INVENTION

Figure 1:
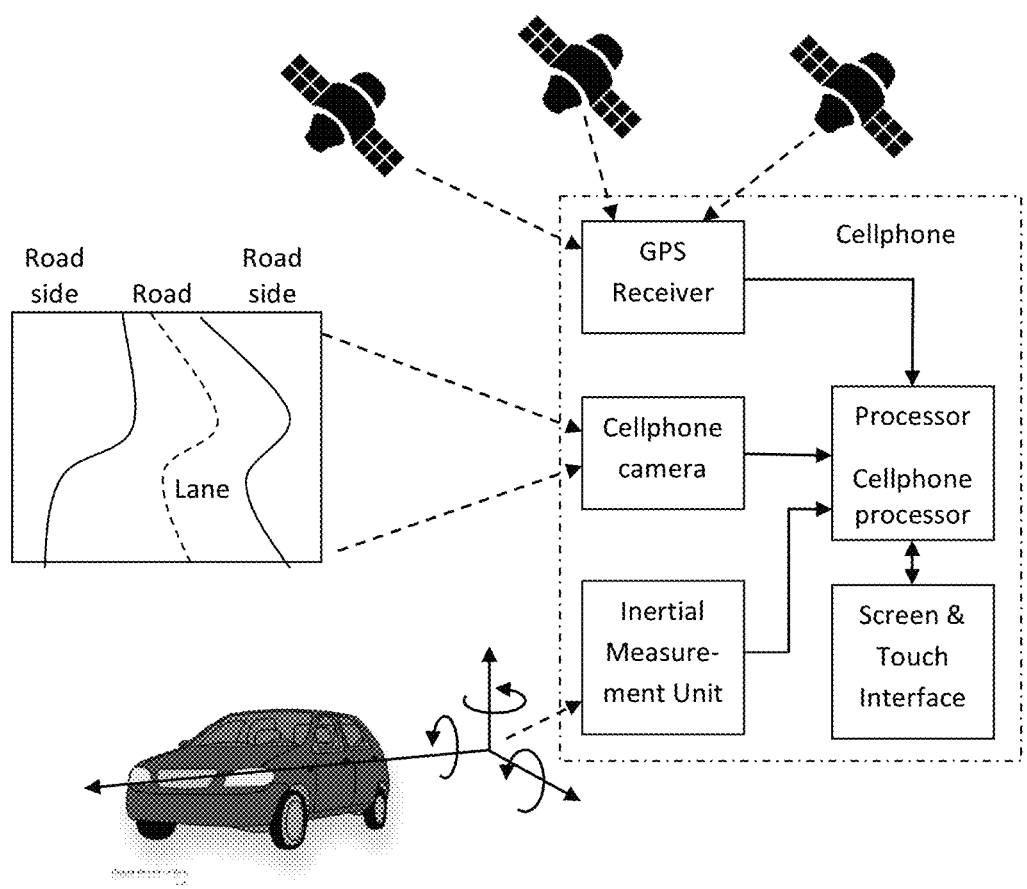
FIG. 1 depicts the internal GPS unit of a cellphone, or less expensive GPS receiver, along with two additional data sources.

In broad and general terms, this invention acquires lane-level precise road map data in a cost efficient manner. Typical phone or vehicle based GPS receivers provide 5-8 meter circular error probability (CEP) accuracy. What is needed for precision autonomous drive applications is nominally 10 cm or 4 inches (about ½ a tire width—although one might get by with less accuracy on wider road lanes).

There are two basic ways to achieve better location accuracy. One method is to employ RTK (Real Time Kinematics) or DGPS (Differential GPS) correction leading to accuracies of 2 to 20 cm CEP. The other method is to take advantage of knowing that GPS is a random walk error within its CEP, so more data points of nominally the same location will improve accuracy by nominally $1/\sqrt{n}$, where n is the number of points. More n points are available if more independent GPS receivers are used (4 receivers improve accuracy by about a factor of 2 so four 5 meter GPS units are effectively a 2.5 meter system). It takes about a factor of 25 to obtain a 5 meter GPS error down to a ⅕ meter error (20 cm) or nominally 625 points (with a 10 point per second system that is about 1 minute of data).

While standing still performing surveying, DGPS, RTK, or point averaging is practical. However, in a moving vehicle with only a 5 meter GPS on-board, all approaches have issues. RTK and DGPS units are not presently available on phones or for less expensive GPS receivers. Furthermore, RTK requires a reference unit (which is often available over the Internet, but may not be), and DGPS requires a satellite subscription service. Point averaging requires either long standing still periods or a way to fit curves to GPS data streams so that more points can be accounted for in a fitting process. This approach is most often used in post processing GPS data.

In our approach, we use the internal GPS unit of a cellphone or less expensive GPS receiver along with two additional data sources [FIG. 1]. The first data source is the internal inertial sensors of the phone (or low cost add-in inertial measurement unit, IMU), and the second source is the lane track from a look-a-head (and/or look-behind) camera (typically the one mounted on the rear side of the phone, but could also be a front looking camera mount on the front or rear of the vehicle). A look-a-head camera feeds image data to a processing system that identifies the camera's (and therefore the vehicle's) position within the road lane. The IMU provides time local measurement of acceleration and turn rate in three dimensions where:

$$\text{Position}(P_X P_Y P_Z) = \Sigma_t(\Sigma_t\{A_x\ A_y\ A_z\} + V_0) + P_0 \text{ and}$$
$$\text{Driving direction}(\alpha\beta\gamma) = \Sigma_t\{d_\alpha\ d_\beta\ d_\gamma\} + [\alpha_0\ \beta_0\ \gamma_0]$$

where $P_0$ and $V_0$ were respectively the last known good position update and the last known velocity update for the vehicle, and Ax, Ay and Az are measured acceleration over time. $[\alpha_0\ \beta_0\ \gamma_0]$ are the last known good heading, and $d_\alpha$, $d_\beta$, $d_\gamma$ the three measure heading change gyro measurements.

Figure 2:
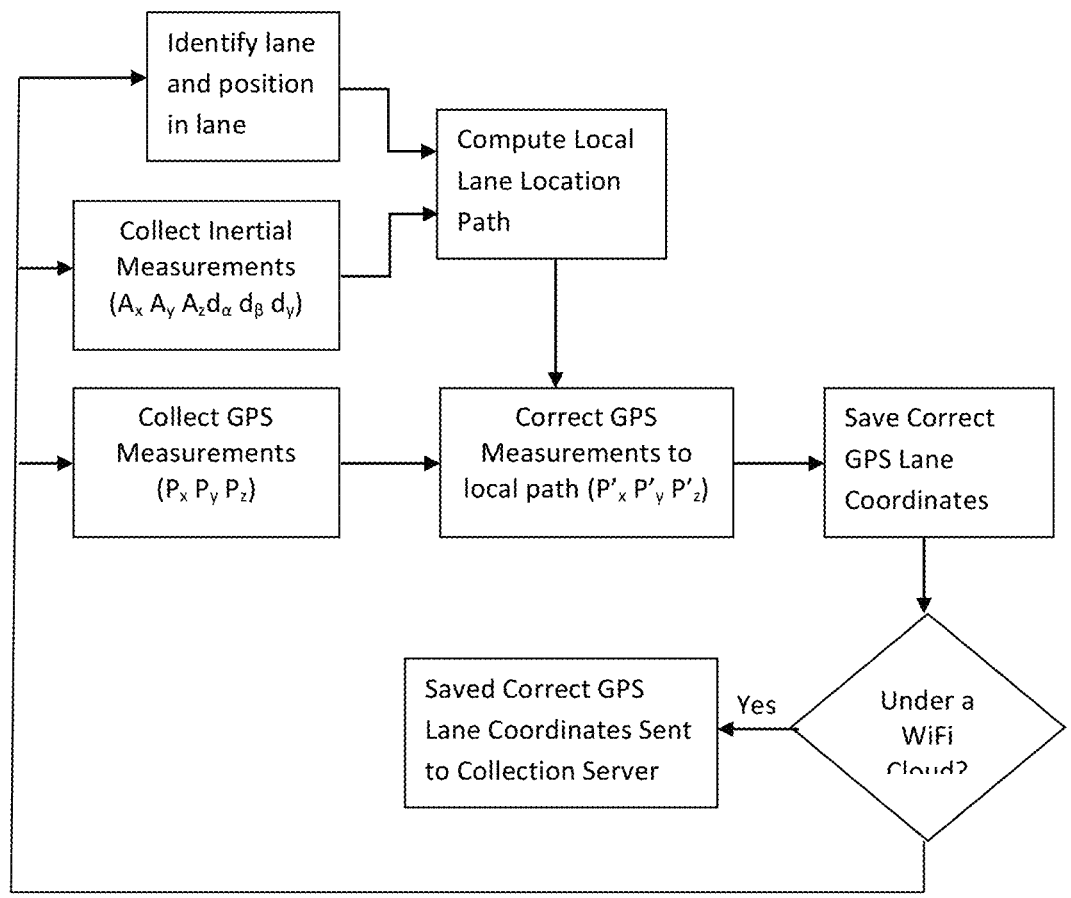
FIG. 2 illustrates how, using two constructs for localizing one set of GPS measurements over fairly long times along locally known drive paths is becomes possible to collect the necessary number of points for substantially reducing GPS error by curve fitting.
Figure 3:
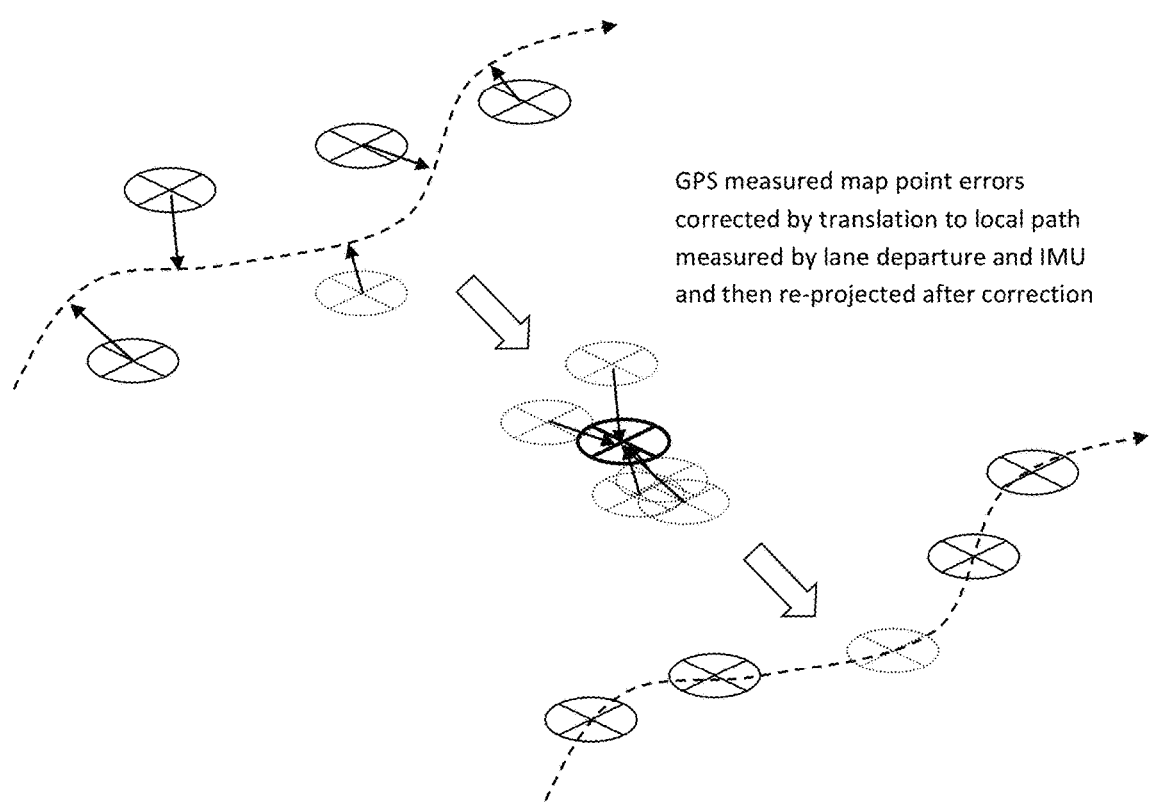
FIG. 3 shows how GPS measured map point errors are corrected by translation to local path measured by lane departure and IMU, then re-projected after correction.
Figure 4:
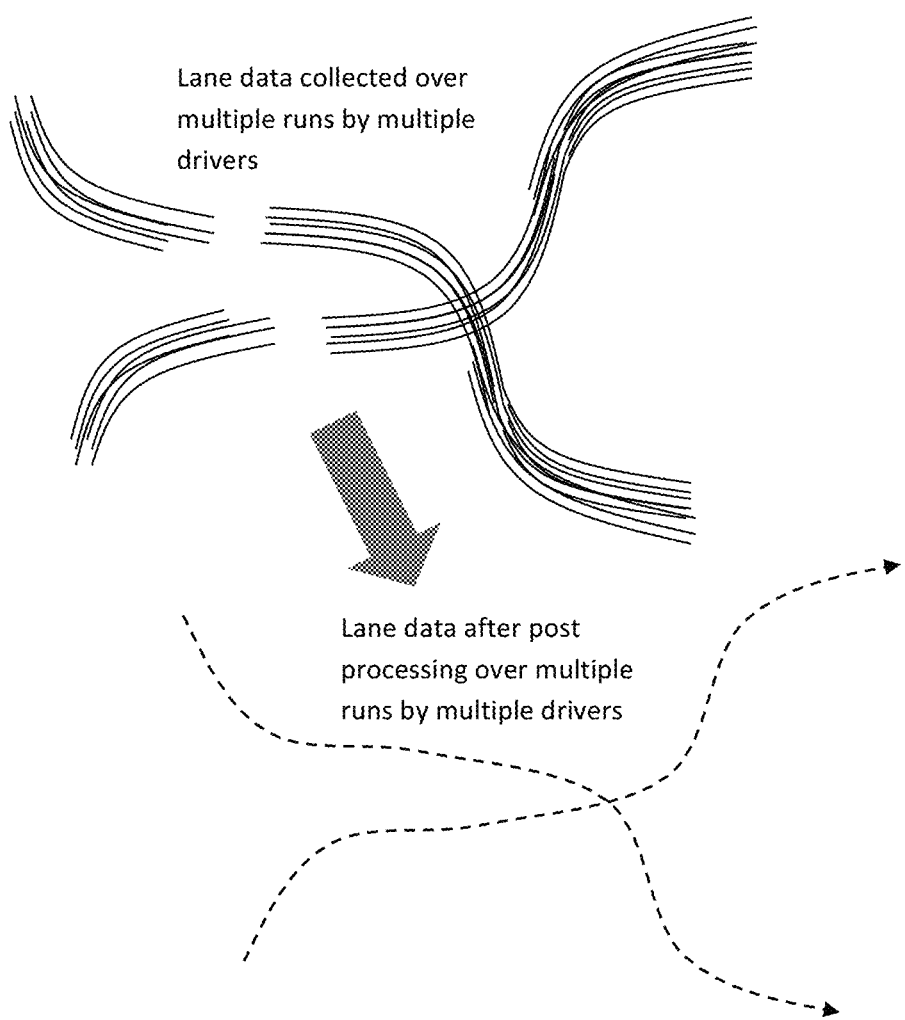
FIG. 4 shows how, in the case of multiple drives through the same basic road and lane path, it becomes possible to correlate the multiple drive point collections to achieve even more accurate track data for each track a vehicle is likely to drive, potentially over long distances.

Using these two constructs for localizing one set of GPS measurements over fairly long times along locally known drive paths is becomes possible to collect the necessary number of points for substantially reducing GPS error by curve fitting [FIG. 2]. Furthermore, in the case of multiple drives through the same basic road and lane path, it becomes possible to correlate the multiple drive point collections to achieve even more accurate track data for each track a vehicle is likely to drive, potentially over long distances [FIG. 3][FIG. 4].

Figure 5:
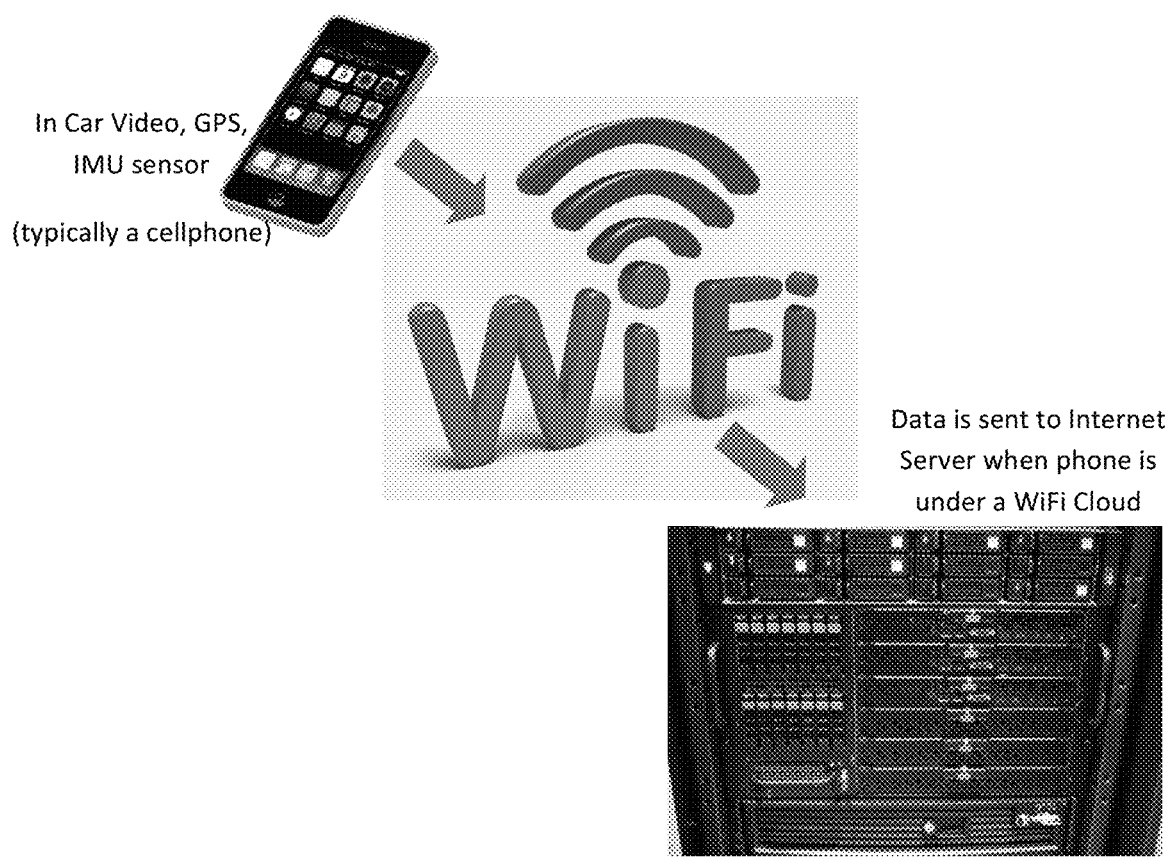
FIG. 5 depicts a system that also sends data to a central data repository for post processing whenever an enabled phone (or alternative data collection system with camera, GPS, and inertial measurement unit) passes under a WiFi cloud, thereby enabling low cost high speed data set transfer to the central collection and aggregation point.

So our system not only collects the GPS track data, the inertial data, and the lane position data, it also sends this data to a central data repository for post processing whenever an enabled phone (or alternative data collection system with camera, GPS, and inertial measurement unit) passes under a WiFi cloud, thereby enabling low cost high speed data set transfer to the central collection and aggregation point [FIG. 5].

By post processing fitting, and reformatting this data, we can build up precise maps, not only of road positions, but also lane locations within the roads by data collected by numerous drivers. Because drivers provide paths around transient road features like construction sites or traffic diversions, or over newly opened road and lane paths, within a short period of time we can either modify or update these precisions maps point sets without send out specific road survey crews.

Alternative Comparable Solutions

Figure 6:
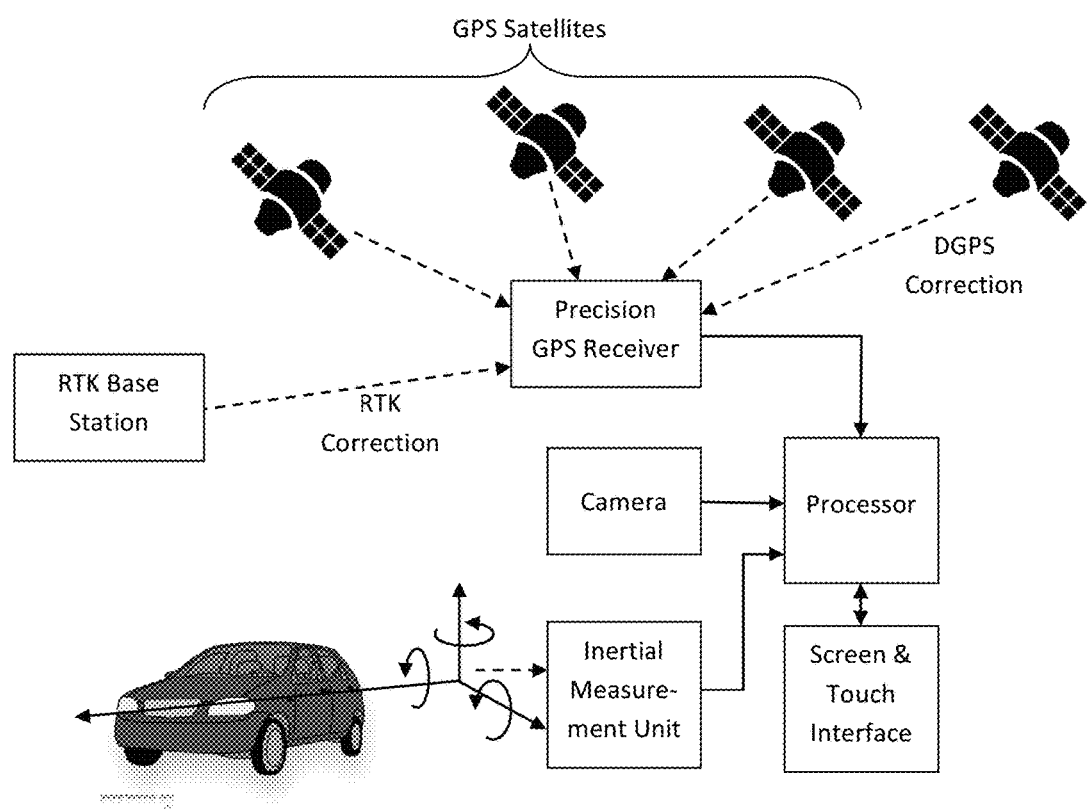
FIG. 6 shows how same data can be acquired by DGPS or RTK using GPS only.

The same data can be acquired by DGPS or RTK using GPS only, although one would be well advised to also include a similar IMU-based curve fitting approach because both RTK and DGPS sometimes are intermittent, leaving unmapped segments of the roadway. The disadvantage is that the smartphone presently does not provide these enhanced GPS features [FIG. 6].

It is possible to map roads by aerial or satellite overheated imagery. In both cases the location of the capture platform must be precisely known, and the camera must resolve down to nominally 20 cm. For aircraft, knowing location this precisely is challenging and for satellite, high enough camera resolution is challenging. In both cases human assisted identification of known ground landmarks and curve fitting can improve the data to the necessary degree, but the data collector must own satellite or aircraft and must have many ground survey analysts to provide the necessary data fitting and correction oversight.

Advantages of Our Lane Departure Approach

Figure 7:
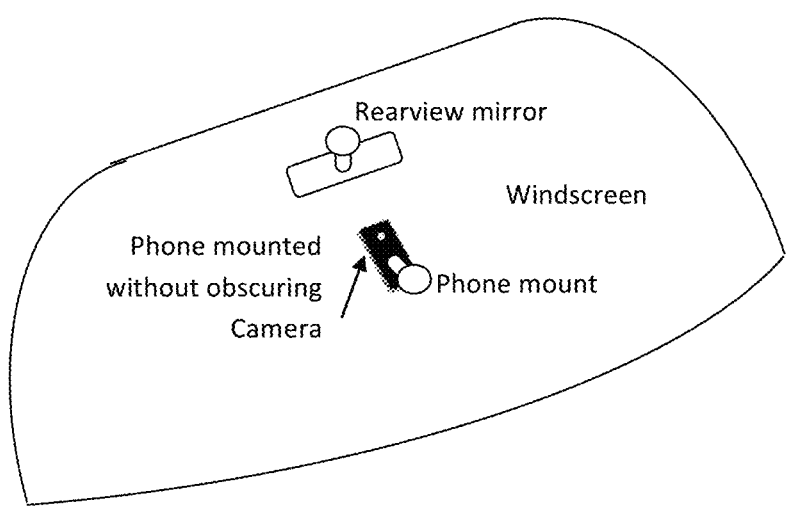
FIG. 7 illustrates an entire data collection part as part of an app in a smartphone mounted to the driver's windshield or dashboard.

The entire data collection part can be an app in a smartphone mounted to the driver's windshield or dash [FIG. 7]. The lane departure system can be used to provide automatic lane departure warnings or lane keeping steering automation (coupled with look-a-head object identification by either radar or also by phone camera, also speed control—with look-a-head sign finding, speed limit and other traffic control obeisance). Accordingly, the invention represents an advance towards fully automated driving of vehicles, familiarizing the driving public with the pros and cons of this new technology without investment in state-of-the-art vehicles that incorporate some or all of this technology in a vehicle proprietary manner.

The invention claimed is:

1. An in-vehicle system for generating precise, lane-level road map data, comprising:
    a GPS receiver operative to acquire positional information associated with a track along a road path, and wherein the positional information has an accuracy;
    an inertial sensor providing time local measurement of acceleration and turn rate along the track;
    a camera operative to acquire image data of the road path along the track;
    a processor operative to receive the local measurement from the inertial sensor and image data from the camera over time in conjunction with multiple tracks along the road path, and generate improved GPS coordinates through curve fitting; and
    a transmitter for transmitting the improved GPS coordinates to a remote data repository for post processing to generate precise road map data for subsequent use by the same or different vehicles.

2. The system of claim 1, wherein one or all of the GPS receiver, inertial sensor and camera are disposed in a smartphone.

3. The system of claim 1, wherein the camera is a look-ahead or look-behind camera.

4. The system of claim 1, wherein the inertial sensor provides time local measurement of acceleration and turn rate in three dimensions, and wherein the processor is operative to solve for vehicle position as follows:

$$\text{Position } (P_X P_Y P_Z) = \Sigma_t(\Sigma_t\{A_x\ A_y\ A_z\} + V_0) + P_0 \text{ and}$$
$$\text{Driving direction } (\alpha\beta\gamma) = \Sigma_t\{d_\alpha\ d_\beta\ d_\gamma\} + [\alpha_0\ \beta_0\ \gamma_0]$$

where $P_0$ and $V_0$ were respectively the last known good position update and the last known velocity update for the vehicle, and Ax, Ay and Az are measured acceleration over time; $[\alpha_0\ \beta_0\ \gamma_0]$ are the last known good heading, and $d_\alpha\ d_\beta\ d_\gamma$ the three measure heading change gyro measurements.

5. The system of claim 1, wherein the precise road map data generated through post processing includes lane locations within roads based upon data collected from multiple drivers.

6. The system of claim 1, wherein the road map data is uploaded to a central data repository for post processing when the vehicle passes through a WiFi cloud.

7. The system of claim 1, wherein:
the road map data includes paths around transient road features; and
the precise road map data is updated for multiple vehicles in accordance with the transient road features.

8. The system of claim 7, wherein the transient road features include one or more of the following:
construction sites,
traffic diversions, and
newly opened road or lane paths.

9. The system of claim 1, wherein the vehicle is an autonomous vehicle.

10. A method of generating precise lane-level road map data in a vehicle, comprising the steps of: collecting GPS track data along a road path; collecting inertial data and lane position data over time in conjunction with multiple tracks along the road path; improving the GPS track data with curve fitting using the collected inertial data and the lane position data; and transmitting the improved GPS track data to a remote data repository for subsequent use by the same or different vehicles.

11. The method of claim 10, wherein the lane position data is acquired from a look-ahead or look-behind camera.

12. The method of claim 10, wherein the processor is operative to solve for vehicle position as follows:

$$\text{Position } (P_X P_Y P_Z) = \Sigma_t(\Sigma_t\{A_x\ A_y\ A_z\} + V_0) + P_0 \text{ and}$$
$$\text{Driving direction } (\alpha\beta\gamma) = \Sigma_t\{d_\alpha\ d_\beta\ d_\gamma\} + [\alpha_0\ \beta_0\ \gamma_0]$$

where $P_1$ and $V_1$ were respectively the last known good position update and the last known velocity update for the vehicle, and Ax, Ay and Az are measured acceleration over time; $[\alpha_0\ \beta_0\ \gamma_0]$ are the last known good heading, and $d_\alpha\ d_\beta\ d_\gamma$ the three measure heading change gyro measurements.

13. The method of claim 10, including the step of uploading the data to a central data repository for post processing.

14. The method of claim 10, including the step of uploading the data to a central data repository for post processing whenever the vehicle passes through a WiFi cloud.

15. The method of claim 10, wherein:
the road map data includes paths around transient road features; and
the precise road map data is updated for multiple vehicles in accordance with the transient road features.

16. The method of claim 15, wherein the transient road features include one or more of the following:
construction sites,
traffic diversions, and
newly opened road or lane paths.

17. The method of claim 10, wherein the vehicle is an autonomous vehicle.

\* \* \* \* \*